United States Patent
Cao

(10) Patent No.: US 10,111,097 B2
(45) Date of Patent: Oct. 23, 2018

(54) METHOD FOR NETWORK TRAFFIC ROUTING

(71) Applicant: Sercomm Corporation, Taipei (TW)

(72) Inventor: Ruoyu Cao, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 15/808,847

(22) Filed: Nov. 9, 2017

(65) Prior Publication Data

US 2018/0176779 A1    Jun. 21, 2018

(30) Foreign Application Priority Data

Dec. 15, 2016  (CN) .......................... 2016 1 1160070

(51) Int. Cl.
*H04W 12/06* (2009.01)
*H04W 40/20* (2009.01)
*H04W 12/08* (2009.01)
*H04W 84/04* (2009.01)

(52) U.S. Cl.
CPC ........... *H04W 12/06* (2013.01); *H04W 12/08* (2013.01); *H04W 40/20* (2013.01); *H04W 84/045* (2013.01)

(58) Field of Classification Search
CPC .... H04W 84/045; H04W 8/082; H04W 76/20
See application file for complete search history.

(56) References Cited

U.S. PATENT DOCUMENTS

2012/0189016 A1* 7/2012 Bakker ............... H04W 76/021
                                                   370/401
2013/0083773 A1* 4/2013 Watfa ................ H04W 36/0033
                                                   370/331
2016/0330664 A1* 11/2016 Liu ....................... H04W 8/082

* cited by examiner

*Primary Examiner* — Diane Mizrahi
(74) *Attorney, Agent, or Firm* — Winston Hsu

(57) ABSTRACT

The present invention discloses how a small cell accesses a local network via the LIPA technique and discloses a data transmission path and data transmission protection of a local service. A method for network traffic routing for a user equipment of a wireless communication system is disclosed. The method comprises connecting to a small cell of the wireless communication system, transmitting an user identity information to the small cell, receiving an authentication result of an authentication procedure from the small cell, and obtaining a local service via the small cell and a local network connecting to the small cell without going through a core network connecting to the small cell when the authentication result indicates that the user equipment passes the authentication procedure.

9 Claims, 4 Drawing Sheets

METHOD FOR NETWORK TRAFFIC ROUTING

BACKGROUND OF THE INVENTION

1. Field of the Invention

The present invention relates to a method used in a communication device in a wireless communication system, and more particularly, to a method of network traffic routing with an authentication procedure for a local internet protocol access.

2. Description of the Prior Art

With the gradual popularization of 4G technology and large-scale commercial use, demand for network traffic is increasing accordingly. Small cells (e.g. femtocell, picocell, microcell) for local service are deployed in environment.

The 3rd Generation Partnership Project (3GPP) proposes Local Internet Protocol Access (LIPA) technique. In a word, LIPA technique provides an advantage of that the user equipment's traffic is directly routed to the Internet via the local network, without going through the core network of an operator, so as to lower the loading and data service cost of the core network and avoid data transmission delay and data leakage.

However, the conventional specification does not discloses how the small cell accesses to the local network of home or enterprise via the LIPA technique and does not discloses data transmission path and data transmission protection of a local service.

SUMMARY OF THE INVENTION

It is therefore one of the objectives of the invention to provide a method for network traffic routing to solve the above problem.

The present invention discloses a method for network traffic routing for a user equipment of a wireless communication system. The method comprises connecting to a small cell of the wireless communication system, transmitting a user identity information to the small cell, receiving an authentication result from the small cell, and obtaining a local service via the small cell and a local network connecting to the small cell without going through a core network connecting to the small cell if the authentication result indicates that the user equipment is qualified for so.

The present invention discloses a method for network traffic routing for a small cell of a wireless communication system. The method comprises connecting to a user equipment of the wireless communication system, receiving user identity information from the user equipment, transmitting the user identity information to an authentication server of a local network connecting to the small cell, receiving an authentication result from the authentication server, and routing a traffic between the user equipment and an authorized communication target in the local network without going through a core network connecting to the small cell if the authentication result indicates that the user equipment is qualified for so.

The present invention discloses a method for network traffic routing for an authentication server of a wireless communication system. The method comprises receiving an user identity information of an user equipment from a small cell of a local network which the authentication server is allocated at, performing an authentication procedure according to the user identity, and transmitting an authentication result to the small cell, wherein the authentication result is used for indicating whether the user equipment is qualified for using a local internet protocol access functionality of the small cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
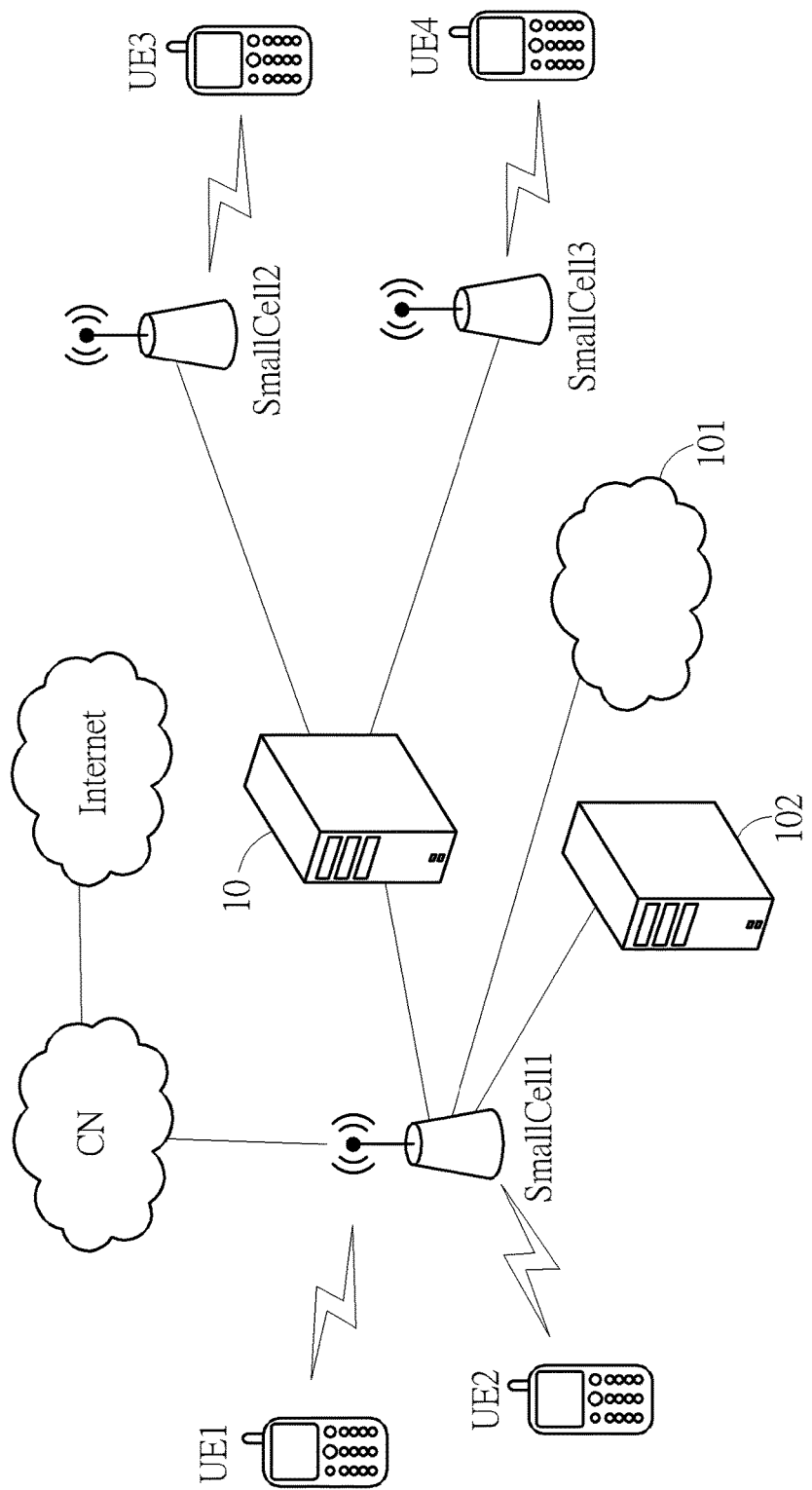
FIG. 1 is a schematic diagram of a wireless communication system.

Please refer to FIG. 1, which is a schematic diagram of a wireless communication system. The wireless communication system is a LTE system or other mobile communication systems. Only those parts of the wireless communication system that are relevant to the invention are depicted in FIG. 1. Those parts include user equipments UE1-UE4, small cells SmallCell1-SmallCell3, core network CN, Internet, authentication server 10 and local network. In this embodiment, the local network may be a single local area network or multiple local networks connected through virtual private network. The local network includes local server 101, file sharing server 102, small cells SmallCell1-SmallCell3, and authentication server 10, but does not include the core network CN. Note that, FIG. 1 is simply utilized for illustrating the structure of the wireless communication system, where the number of user equipments and small cells are not limited herein. In addition, the user equipments can be devices such as mobile phones, computer systems, machine type devices, etc. Examples of the core network CN includes Evolved Packet Core/Enhanced Packed Core (EPC) and similar backbone networks as defined in different generations of mobile or wireless communication standards.

In order to enhance network coverage of an enterprise, the enterprise may deploy small cells on its own, and thus a user equipment can connects with the deployed small cells when the user equipment moves within the enterprise. In FIG. 1, the user equipments UE1-UE2 connect with small cell SmallCell1, the user equipment UE3 connects with small cell SmallCell2, and the user equipment UE4 connects with small cell SmallCell3.

The small cells may need to provide local service through LIPA only to user equipments authorized by the enterprise; hence, the authentication server 10 is introduced in the wireless communication system as shown in FIG. 1. The authentication server 10 is a server deployed within the enterprise for user identity authentication and reporting the authentication result to the small cells and user equipments. The authentication server 10 is configured with user identity information of authorized user equipments; wherein each user equipment's user identity information may include an International Mobile Subscriber Identity (IMSI) or a unique identifier for identifying the user equipment. In addition, the authentication server 10 is shared by the small cells SmallCell1-SmallCell3.

Note that, in conventional specification, small cells SmallCell1-SmallCell3 utilize user identity information of the user equipments UE1-UE4 for performing authentication procedure with the core network CN (e.g. Mobility Management Entity (MME)) after the user equipments UE1-UE4 connect with the small cells SmallCell1-SmallCell3, so that the user equipments UE1-UE4 obtains IP service by the core network CN. In addition to that, in an embodiment of the present invention, after the user equipments UE1-UE4 finish the authentication procedure with the core network CN, the authentication server 10 performs the second authentication procedure for determining whether the a user equipment is qualified for communicating with an authorized communication target, such as a server in the local network as mentioned above, using the LIPA functionality of the small cells SmallCell1-SmallCell3 without going through the core network CN. For example, if the user equipment UE1 passes the second authentication procedure, the small cell SmallCell1 routes the traffic of the user equipment UE1 to an authorized communication target (e.g. the local server 101 or the file sharing server 102) through the local network without going through the core network. For traffic between the user equipment UE1 and a communication target not in the local network, the traffic could still go through the core network CN. On the contrary, if the user equipment UE2 does not pass the second authentication procedure, the small cell SmallCell1 routes the traffic of the user equipment UE2 to the core network CN even if the user equipment UE2 is trying to communicate with a device (e.g. the local server 101 or the file sharing server 102) in the local network.

Figure 2:
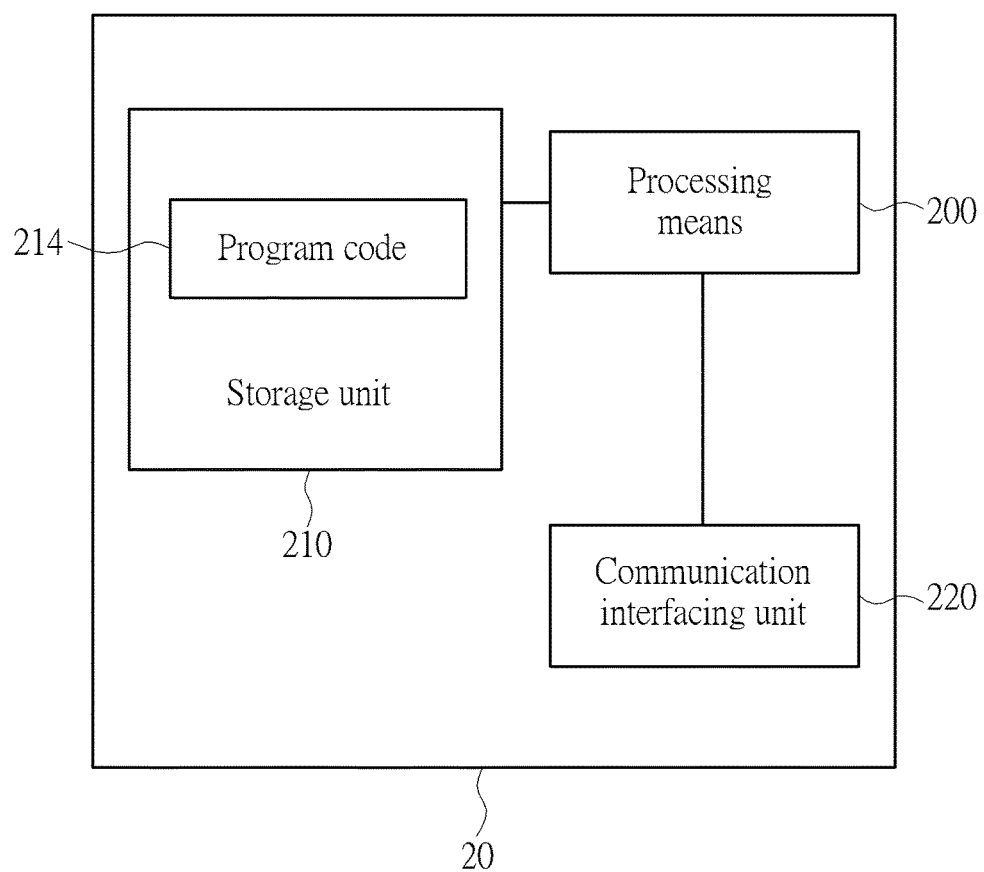
FIG. 2 is a schematic diagram of an exemplary communication device.

FIG. 2 illustrates a schematic diagram of an exemplary communication device 20. The communication device 20 can be the UE, small cell or authentication server shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. The communication interfacing unit 220 is preferably a radio transceiver and can exchange wireless signals with a network (i.e. E-UTRAN) according to processing results of the processing means 200.

Figure 3:
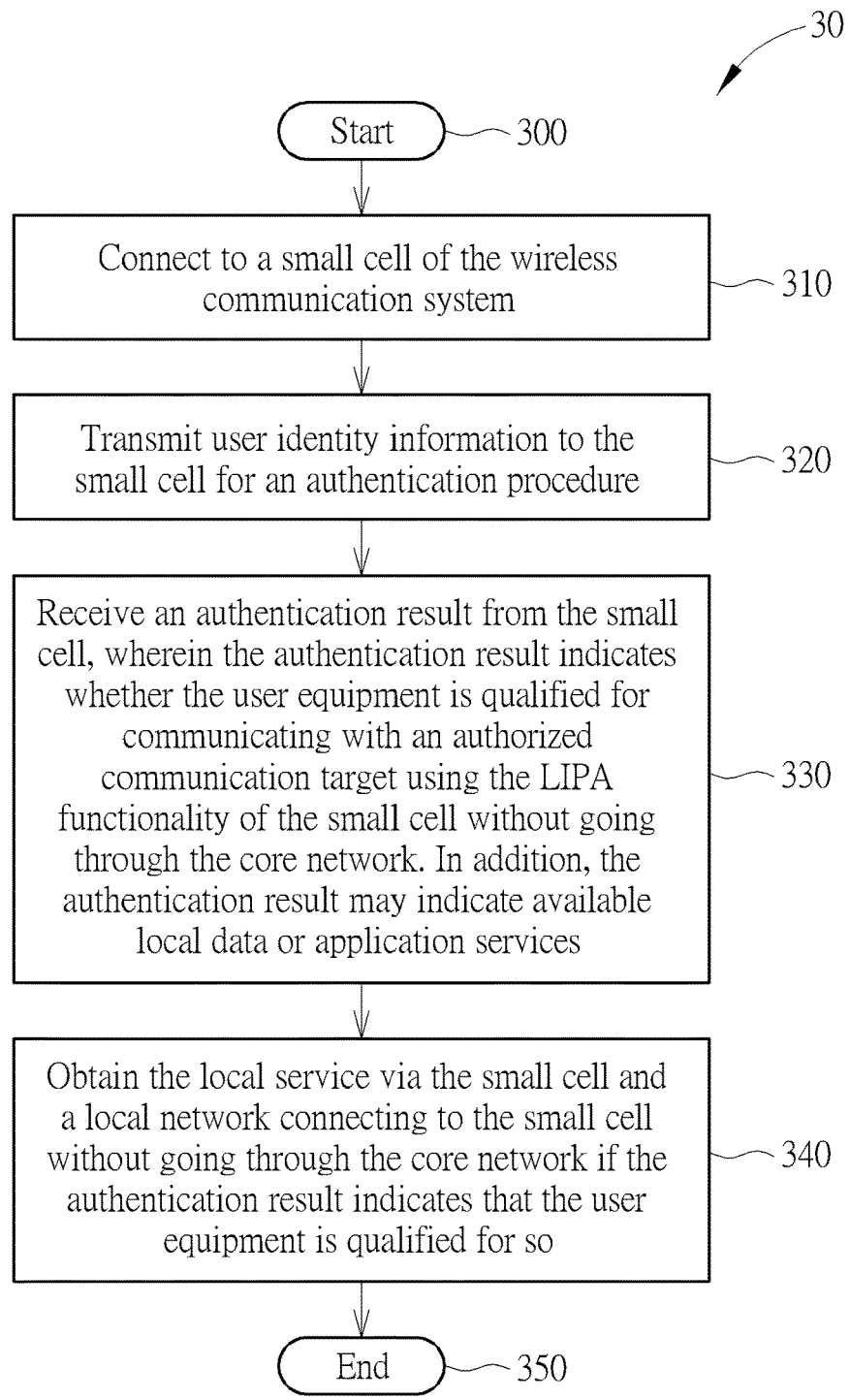
FIGS. 3-4 are flowcharts of a process according to an example of the present disclosure.

Please refer to FIG. 3, which is a flowchart of a process 30 according to an example of the present disclosure. The process 30 is utilized in the communication device 20 (i.e. a UE in FIG. 1) for obtaining the local service provided by the enterprise. The process 30 may be compiled into a program code 214 to be stored in the storage unit 210, and may include the following steps:

Step 300: Start.
Step 310: Connect to a small cell of the wireless communication system.
Step 320: Transmit user identity information to the small cell for an authentication procedure.
Step 330: Receive an authentication result from the small cell, wherein the authentication result indicates whether the user equipment is qualified for communicating with an authorized communication target using the LIPA functionality of the small cell without going through the core network. In addition, the authentication result may indicate available local data or application services.
Step 340: Obtain the local service via the small cell and a local network connecting to the small cell without going through the core network if the authentication result indicates that the user equipment is qualified for so.
Step 350: End.

According to the process 30, the user equipment knows whether it can use the LIPA functionality of the small cell for obtaining the local service (e.g. from local mail server, file sharing server, IP phone, and printer server) provided by the enterprise after the authentication procedure.

In an embodiment, the user equipment (e.g. mobile phone or panel) is able to display the result of the authentication procedure. For example, an authentication status light is displayed on the monitor of the mobile phone for indicating the authentication status and result. The authentication status light in "Red" represents that the user equipment does not pass the authentication procedure, and therefore is not able to directly obtain the local service via the small cell and local network, the authentication status light in "Yellow" represents that the authentication procedure is on going, and the authentication status light in "Green" represents that the user equipment passes the authentication procedure, and therefore is able to directly obtain the local service via the small cell and local network without going through the core network. Data and application service irrelevant to the local network could still go through the small cell and the core network.

Figure 4:
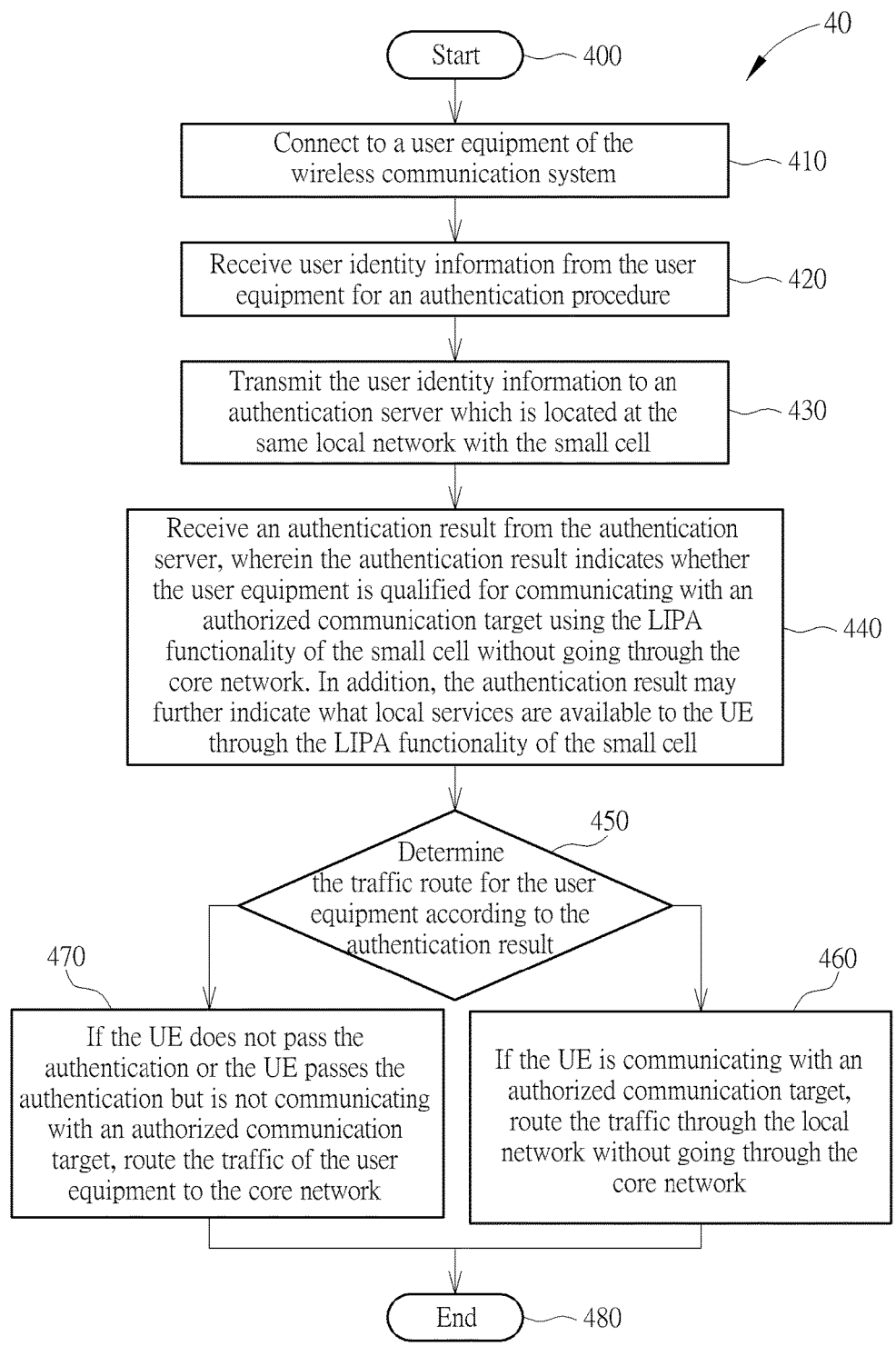

Please refer to FIG. 4, which is a flowchart of a process 40 according to an example of the present disclosure. The process 40 is utilized in the communication device 20 (e.g. the small cell in FIG. 1) for network traffic routing. The process 40 may be compiled into a program code 214 to be stored in the storage unit 210, and may include the following steps:

Step 400: Start.
Step 410: Connect to a user equipment of the wireless communication system.
Step 420: Receive user identity information from the user equipment for an authentication procedure.
Step 430: Transmit the user identity information to an authentication server which is located at the same local network with the small cell.
Step 440: Receive an authentication result from the authentication server, wherein the authentication result indicates whether the user equipment is qualified for communicating with an authorized communication target using the LIPA functionality of the small cell without going through the core network. In addition, the authentication result may further indicate what local services are available to the UE through the LIPA functionality of the small cell.
Step 450: Determine the traffic route for the user equipment according to the authentication result.
Step 460: If the UE is communicating with an authorized communication target, route the traffic through the local network without going through the core network.
Step 470: If the UE does not pass the authentication or the UE passes the authentication but is not communicating with an authorized communication target, route the traffic of the user equipment to the core network.
Step 480: End.

According to the process 40, small cell of the enterprise transmits the user identity information (e.g. IMSI or unique identifier) to the authentication server deployed by the enterprise, and forwards the authentication result to the user equipment after receiving the authentication result from the authentication server. If it's ordinary for UE to send IMSI to small cell, the UE needs not to be specially configured. However, if the user identity information is not IMSI, the UE may need to have special configuration in order to send that user identity information to the small cell for authentication.

Note that, the user identity information of authorized UEs can be pre-stored in the authentication server (e.g. an identity list including the user identity information and the corresponding authorized local services). For example, each UE has different access rights for the local services. In other words, each UE that passes the authentication procedure may obtain different local services. For example, one UE is able to obtain printing service, but is not able to obtain file share service or IP phone service. On the other hand, the UE with high access right is able to obtain all local data and application services provided by the enterprise.

Details of the network traffic routing with authentication procedure is described as follows. When one UE of the enterprise moves within the enterprise, the UE connects to the small cell deployed by the enterprise. The small cell receives the user identity information (e.g. IMSI or other unique identifier) from the UE, and then transmits to the authentication server for user identity authentication. The authentication server performs authentication on the user identity information received from the small cell, and responds to the small cell with an authentication result. Then, the small cell forwards the authentication result to the UE, and stores the authentication result for determining how to route the traffic of this UE.

The small cell determines the traffic route according to the stored authentication results and user access rights. For example, one UE is not a member of the enterprise or does not have the access right for obtaining the local service if the UE fails the authentication, and thus the traffic of the UE will be routed to the core network of the operator. Another UE is a member of the enterprise and has the access right for obtaining the local service if the UE passes the authentication, and thus the traffic of the UE related to the local service will be routed to the local network without going through the core network. However, for traffic of the UE that is irrelevant to the authorized local service, the traffic will still be routed to the core network.

If one UE enters the enterprise and connects to the small cell of the enterprise, the UE is able to obtain a predetermined service provided by the enterprise via the local network, without going through the core network. In addition, the UE may check available local services (e.g. file sharing service for downloading internal documents) with the local network. As abovementioned, authentication result may be displayed with the authentication status light on the UE.

In conclusion, the present invention addresses to a method of network traffic routing. In detail, with the authentication procedure, the user equipment knows whether it can obtain the local service via the connected small cell, which routes the traffic of the user equipment directly to the local network by the LIPA functionality, so as to provide safe and efficient local service of the enterprise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for network traffic routing for a user equipment of a wireless communication system, the method comprising:
   connecting to a small cell of the wireless communication system;
   transmitting a user identity information to the small cell;
   receiving an authentication result of an authentication procedure from the small cell; and
   obtaining a local service via the small cell and a local network connecting to the small cell without going through a core network connecting to the small cell when the authentication result indicates that the user equipment passes the authentication procedure.

2. The method of claim 1, wherein the user identity information is an International Mobile Subscriber Identity (IMSI) or an unique identifier arranged to identify the user equipment, the authentication result is further indicates a list of local services which the user equipment passing the authentication procedure can obtain via the small cell and the local network without going through the core network, and the method further comprises: displaying a content of the authentication result.

3. A method for network traffic routing for a small cell of a wireless communication system, the method comprising:
   connecting to a user equipment of the wireless communication system;
   receiving a user identity information from the user equipment;
   transmitting the user identity information to an authentication server of a local network connecting to the small cell; and
   receiving an authentication result of an authentication procedure from the authentication server; and
   routing a traffic between the user equipment and an authorized communication target in the local network without going through a core network connecting to the small cell when the authentication result indicates that the user equipment passes the authentication procedure.

4. The method of claim 3, further comprising:
   transmitting the authentication result to the user equipment; and
   storing the authentication result, which indicates whether the user equipment passes the authentication procedure such that can use a Local Internet Protocol Access (LIPA) functionality of the small cell, to determine the traffic of the user equipment is routed to the core network or to the local network.

5. The method of claim 3, wherein the authentication result is further arranged to indicate an available local service which the user equipment passing the authentication procedure can obtain, the user identity information is an International Mobile Subscriber Identity (IMSI) or an unique identifier arranged to identify the user equipment, and the small cell establishes an identity list associated to the user identity information and a local service authentication information corresponding to the user identity information.

6. The method of claim 5, further comprising:
   determining a traffic of the user equipment is routed to the core network or to the local network according to the authentication result and the local service authentication information of the authentication result.

7. The method of claim 6, wherein the step of determining the traffic of the user equipment is routed to the core network or to the local network according to the authentication result and the local service authentication information comprises:
   routing the traffic of the user equipment to the core network when the authentication result indicates the user equipment passes the authentication procedure such that can use a LIPA functionality of the small cell but the traffic is not directed to the authorized communication target in the local network; or
   routing the traffic of the user equipment to the local network when the authentication result indicates the user equipment passes the authentication procedure such that can use the LIPA functionality of the small cell and the traffic is directed to the authorized communication target in the local network.

8. A method for network traffic routing for an authentication server of a wireless communication system, the method comprising:
receiving an user identity information of an user equipment from a small cell of a local network which the authentication server is allocated at;
performing an authentication procedure according to the user identity; and
transmitting an authentication result to the small cell, wherein the authentication result is arranged to indicate whether the user equipment passes the authentication procedure such that can communicate with an authorized communication target in the local network using a Local Internet Protocol Access (LIPA) functionality of the small cell without going through a core network connecting to the small cell.

9. The method of claim 8, wherein the authentication result message is arranged to indicate an available local service which the user equipment passing the authentication procedure can obtain, the user identity information is an International Mobile Subscriber Identity (IMSI) or an unique identifier arranged to identify the user equipment; and the authentication server pre-stores an identity list associated to the user identity information and a local service authentication information corresponding to the user identity information.

* * * * *